(12) United States Patent
Park

(10) Patent No.: US 7,292,533 B2
(45) Date of Patent: Nov. 6, 2007

(54) SYSTEM AND METHOD FOR CONTROLLING DATA TRANSMISSION ADAPTED FOR GRID COMPUTING AND COMPUTER READABLE RECORDING MEDIUM OF RECORDING PROCESS THEREOF

(75) Inventor: Hyoung Woo Park, Daejon (KR)

(73) Assignee: Korean Institute of Science and Technology Information, Daejon (KR)

( * ) Notice: Subject to any disclaimer, the term of this patent is extended or adjusted under 35 U.S.C. 154(b) by 1061 days.

(21) Appl. No.: 10/330,475

(22) Filed: Dec. 30, 2002

(65) Prior Publication Data

US 2004/0120256 A1    Jun. 24, 2004

(30) Foreign Application Priority Data

Dec. 23, 2002   (KR) ................ 10-2002-0082636

(51) Int. Cl.
  *H04L 12/28* (2006.01)
  *G06F 15/16* (2006.01)
(52) U.S. Cl. .................. 370/235; 370/252; 709/232
(58) Field of Classification Search ........ 370/229–235, 370/252; 709/220–226, 232, 233, 235
See application file for complete search history.

(56) References Cited

U.S. PATENT DOCUMENTS

| 6,078,957 | A | * | 6/2000 | Adelman et al. ........... 709/224 |
| 6,205,120 | B1 |  | 3/2001 | Packer et al. |
| 6,219,713 | B1 |  | 4/2001 | Ruutu et al. |
| 6,405,257 | B1 | * | 6/2002 | Gersht et al. ............... 709/235 |
| 6,643,259 | B1 | * | 11/2003 | Borella et al. .............. 370/231 |
| 6,760,769 | B2 | * | 7/2004 | Jayam et al. ............... 709/228 |
| 2002/0188740 | A1 | * | 12/2002 | Tang et al. ................. 709/230 |

OTHER PUBLICATIONS

A Directory Service for Configuring High-Performance Distributor Computations, Steven Fitzgerald et al., I.E.E.E. 1997 (1082-8907/97, month not provided).*

* cited by examiner

*Primary Examiner*—Wing Chan
*Assistant Examiner*—Hong Sol Cho
(74) *Attorney, Agent, or Firm*—Jordan and Hamburg LLP

(57) ABSTRACT

Disclosed are a system and a method for controlling a data transmission adapted for a grid computing and a computer readable recording medium of recording a process thereof, in which efficiently perform a grid computing using an ultrahigh speed communication network from an ultrahigh speed communication network in a non-congestion state to a communication network in a congestion state. TCP state information-providing section stores and provides TCP state information of a network. TCP state information-initializing section initializes TCP state information. Transmission mode-judging section judges a transmission mode of data to be transmitted according to the TCP state information. Packet processor generates and transmits traffic corresponding to each transmission mode classified according to the judgment result from transmission mode-judging section.

21 Claims, 5 Drawing Sheets

SYSTEM AND METHOD FOR CONTROLLING DATA TRANSMISSION ADAPTED FOR GRID COMPUTING AND COMPUTER READABLE RECORDING MEDIUM OF RECORDING PROCESS THEREOF

BACKGROUND OF THE INVENTION

1. Field of the Invention

The present invention relates to a system and a method for controlling a data transmission adapted for a grid computing and a computer readable recording medium of recording a process thereof. The present invention, more particularly, relates to a system and a method for controlling a data transmission adapted for a grid computing and a computer readable recording medium of recording a process thereof in which improves a transmission capability in an ultrahigh speed communication network or a grid network environment, and improves a grid computing capability by sharing transmission control protocol (hereinafter, referred to as "TCP") state information in the grid network environment.

2. Description of the Prior Art

In 1969, Internet was introduced as a construction of Advanced Research Projects Agency Network (ARPANET) in the United States. Internet binds various sub-networks such as an exclusive line, ATM, a local area network (LAN), and a mobile network to an unified Internet Protocol (IP). Various application services of Internet are not supported sufficiently by the IP which provides a datagram service. A TCP (TCP) or a User Datagram Protocol (UDP) is additionally used in order to support the various application services of Internet.

The TCP is used when an application exchanges many packets continuously and stably between terminals without errors. The UDP needs not correct the loss or defect of packets. The UDP is used when a plurality of applications multiplex the packets in order to share one IP. The TCP is used for application services of higher reliance and the UDP is used for application services of lower reliance. In other words, the UDP provides a connectionless, datagram oriented service which provides a non-reliable delivery mechanism for streams of information. The TCP provides a reliable session-based service for delivery of sequenced packets of information across the Internet.

The TCP compensates for a function of the IP so that the IP is adapted to a data communication which do not allow errors. In order to provide services of higher reliance, a virtual line is set between terminals and every packet to be transmitted afterwards have sequence numbers. Accordingly, the network senses packets which are lost, the sequence of which changes, or are repeatedly received. When the packets are lost, the network informs the number of the lost packets in order to again receive them.

The TCP was developed on the assumption that the network is in a congestion state. As the means for controlling congestion, a method is used to control a total amount of packets per a Round Trip Time (RTT) capable of transmitting the packets. However, nowadays, since a grid network using an ultrahigh speed communication network frequently becomes in a non-congestion state or congestion free state, a conventional algorithm cannot be operated efficiently and actively.

In an Internet type ultrahigh speed communication network, since a conventional TCP does not know a speed of an interlocked network, it executes a packet loss based transmission control algorithm within a physical size of a sender/receiver buffer which is previously set in order to transmit data. In order to improve the conventional TCP in an ultrahigh speed communication network environment, a method for multiple-connecting the TCP in parallel and transmitting mass data through a parallel transmission of data has been developed. Also, a method for increasing sizes of a sender buffer and a receiver buffer transmitting data as much as possible to the network at a time has been developed. The sender buffer and the receiver buffer temporarily store transmitted data therein until it is confirmed whether data are normally transmitted.

However, in order to transmit mass data by the above methods, the sender buffer and the receiver buffer should each has the greatest size. It reduces the efficiency of the conventional TCP. Since the conventional TCP does not know a speed of an ultrahigh speed communication network in use each time the conventional TCP is used, it executes a packet loss-based transmission control algorithm within a physical size of a sender/receiver buffer which is previously set in order to transmit data. Accordingly, when congestion does not occur through an ultrahigh speed grid network, the conventional TCP cannot transmit a packet having a size greater than a previously set size of sender/receiver buffer.

The reason is because the conventional TCP has been developed to control a network congestion as the main object. It is also because a method for controlling a total amount of packets per a RTT capable of transmitting the packets as the means for controlling congestion is limited to a size of TCT sender/receiver buffer.

As stated previously, the conventional TCP has a structural problem that a maximal transmission performance and a bandwidth searching function are limited to a physical size of a receiving window buffer. For such reasons, in order to prevent the occurrence of a congestion in a network, a TCP transmission control study in consideration of 1:1 communication environment has been concentrated based on a congestion network. Currently, an ultrahigh speed communication network is quickly constructed according to a development of the newest communication technology. A many-to-many communication-based computing technology such as a grid computing has been developed and is widely used. The grid computing uses one resource having an excellent performance by using different computing resources connected to one another through a network.

In the grid computing, communications between participating computing resource groups are frequently achieved. Every time a conventional TCP connection for a computing is performed, after a congestion state of a network is searched, the TCP connection is set. Accordingly, short connections between computing resources in a group like the grid computing are frequently performed, causing lowering a performance of the conventional TCP.

Also, a grid network environment is geographically dispersed, and cooperates with computing resources of high performance, which are dispersed from all parts of the world regardless of constructions and areas by using a network. The TCP should efficiently perform a transmission function of a high performance in a non-congestion state which frequently occurs in an ultrahigh speed communication network. The TCP should efficiently operate in a dispersion parallel computing environment between special computer groups. Therefore, a requirement of an improvement for a data transmission control efficiently operating in such new environments has been on the rise.

SUMMARY OF THE INVENTION

Accordingly, the present invention has been made to solve the above-mentioned problems occurring in the prior art, and an object of the present invention is to provide a system and a method for controlling a data transmission adapted for a grid computing and a computer readable recording medium of recording a process thereof, in which efficiently perform a grid computing using an ultrahigh speed communication network from an ultrahigh speed communication network in a non-congestion state to a communication network in a congestion state.

Hereinafter, a technical subject to be solved by the present invention will be explained in more detail.

1) Because a network speed is lower than a performance of a receiving host, a conventional TCP was developed supposing that a bottleneck in an Internet transmission system occurs through a network. As an ultrahigh speed communication network having a transmission speed of several giga bit or tera bit per second (BPS) grade has been developed, a bottleneck can be occurred in a host according to a performance of the host connected to a communication network instead of the communication network. Accordingly, in order to prevent the occurrence of a bottleneck, the requirement to develop a technique having a transmission control capability in proportion to a performance of a host has been on the rise.

2) In order to improve a transmission capability according to an ultrahigh speed operation of a communication network, a size of a sender/receiver buffer should be additionally increased. For example, to have a transmission capability of a giga bit grade per TCP connection, a memory of a giga bit grade should be additionally set to the conventional TCP. Therefore, it is necessary to develop a technique which improves a transmission capability of a TCP while limiting an increase of size of a sender/receiver buffer in an ultrahigh speed communication network.

3) Since a grid computing is a dispersion parallel type Internet computing, it frequently performs an n:n communication in a congestion network environment. When the conventional TCP developed based on a 1:1 communication environment is used, a packet loss-based network searching phenomenon often occurs, causing significantly lowering a computing performance. Therefore, it is necessary to develop a technique for solving the problems.

In order to accomplish the above object, the present invention uses a virtual buffer concept in order to overcome a conventional TCP performance improvement type structural limit in an ultrahigh speed communication network.

A data transmission control technique having a performance of a conventional TCP and of a new concept extending the performance of a conventional TCP is used for an ultrahigh speed communication network environment and a grid computing characterized by a dispersion parallel computing.

A virtual buffer concept through a packet spacing is used for a receiving host. The packet spacing functions to transmit data to have a predetermined time period between data to be transmitted.

A window size free signaling method has been developed. The window size free signaling method is not limited to an absolute size of a sender/receiver window of a TCP header by performing a virtual buffer-based transmission function. The window size free signaling method does not judge a size of a sender/receiver window of a conventional TCP header as a size of a buffer which is transmitted and received. The window size free signaling method controls a transmission speed of transmission data according to a transmission state.

By using the virtual buffer concept in the present invention, a high speed mode or a non-congestion mode are additionally defined in addition to a slow start mode and a congestion mode. The slow start mode is a transmission mode of a conventional TCP. A transmission mode converting method combining a self-similar model with a conventional packet loss method has been developed. The self-similar model is one example of an Internet traffic model.

A virtual buffer according to the present invention has a characteristic in proportion to a performance of a receiving host in a grid network environment which uses a non-congestion ultrahigh speed communication network. Accordingly, a performance of a virtual buffer for a non-congestion ultrahigh speed communication network is improved in comparison with that of a conventional TCP.

Also, the present invention has a function which processes a TCP state information as one information service of a TCP state information providing system. Supposed that a computer group in a domain A and a computer group in a domain B perform a grid computing. The computing resources of a group A should search a network each time the computing resources of a group A tries to access computing resources of a group B for grid computing in order to communicate computing resources of a group A with computing resources of a group B. However, according to the present invention, by sharing the computing resources of a group A with a network state information searched in the computing resources of a group B, the searching process can be omitted. Such a method significantly improves a performance of a grid computing.

The preferred embodiment of the present invention includes a computer system and a computer program product programmed to execute a method according to the present invention. According to an embodiment of the computer system, a set of command signals are stored in at least one memory. The set of command signal are stored in a recording medium such a CD-ROM as the computer program product.

In accordance with an aspect of the present invention, there is provided a system for controlling a data transmission, the system comprising: a TCP state information-providing section for storing and providing TCP state information of a network which performs a data transmission; a TCP state information-initializing section for initializing TCP state information according to an initial value of a previously set TCP state information or the TCP state information provided from the TCP state information-providing section; a transmission mode-judging section for judging a transmission mode of data to be transmitted according to the TCP state information; and a packet processing processor for generating and transmitting traffic corresponding to each transmission mode classified according to the judgment result from the transmission mode-judging section.

Preferably, the transmission mode includes a slow start mode, a congestion mode, and a high speed mode, and the system further includes a high-speed mode definition section for determining a criterion of the high speed mode and providing the determined criterion of the high speed mode to the transmission mode-judging section. More preferably, the TCP state information-providing section is constructed by using a Metacomputing Directory Service (MDS). Most preferably, a data transmission performance in the slow start mode ranges from a default initial value to a threshold value of the slow start mode wherein the threshold value is a value of a half of a transmission performance when a packet loss of transmission data is detected; a data transmission performance in the congestion mode ranges from the threshold value of the slow start mode to four times of the threshold value of the slow start mode; and a data transmission performance in the high speed mode ranges from four times of the threshold value of the slow start mode to eight times of the threshold value of the slow start mode.

Preferably, the packet processing processor transmits a data packet to have a spacing of zero between data packets to be transmitted in the slow start mode and the congestion mode, and the packet processing processor transmits the data packet to have the spacing which is uniformly divided for a round trip time. The packet processing processor compares a currently received window size with a previously received window size in a congestion mode in which a size of data to be transmitted is equal to or greater than that of data to be received, when the previously received window size is less than or equal to the currently received window size, the packet processing processor transmits a window at a linearly increased speed having a ratio of a value obtained by dividing one maximum segment size per received message by the size of data to be transmitted, and when the previously received window size is greater than the currently received window size, and the packet processing processor transmits the window in a balanced state without increasing a transmission speed. The packet processing processor transmits the packet data at a ratio having one maximum segment size per received message in the high speed mode.

In accordance with another aspect of the present invention, there is provided a method for controlling a data transmission, the method comprising the steps of: (i) storing and providing TCP state information of a network which performs a data transmission; (ii) initializing TCP state information according to an initial value of a previously set TCP state information or the TCP state information provided in step (i); (iii) judging a transmission mode of data to be transmitted according to the TCP state information; and (iv) generating and transmitting traffic corresponding to each transmission mode classified according to the judgment result by step (iii).

The transmission mode includes a slow start mode, a congestion mode, and a high speed mode, and the method further comprising the step of: defining a criterion of the high speed mode prior to performing step (iii). A data transmission performance in the slow start mode ranges from a default initial value to a threshold value of the slow start mode wherein the threshold value is a value of a half of a transmission performance when a packet loss of transmission data is detected; a data transmission performance in the congestion mode ranges from the threshold value of the slow start mode to four times of the threshold value of the slow start mode; and a data transmission performance of the high speed mode ranges from four times of the threshold value of the slow start mode to eight times of the threshold value of the slow start mode.

Step (iv) includes the substep of transmitting a data packet to have an spacing of zero between data packets to be transmitted in the slow start mode and the congestion mode, and transmitting the data packet to have the spacing which is uniformly divided for a round trip time. Step (iv) comprises the substeps of: (iv-1) comparing a currently received window size with a previously received window size in a congestion mode in which a size of data to be transmitted is equal to or greater than that of data to be received, (iv-2) transmitting a window at a linearly increased speed having a ratio of a value obtained by dividing one maximum segment size per received message by the size of data to be transmitted when the previously received window size is less than or equal to the currently received window size, and (iv-3) transmitting the window in a balanced state without increasing a transmission speed of the window when the previously received window size is greater than the currently received window size.

Step (iv) includes the step of: transmitting the packet data at a ratio having one maximum segment size per received message in the high speed mode. Step (iv) includes the step of: performing an uniform dispersion transmission for the packet data after performing steps (iv-2) and (iv-3). Step (iv) includes the step of: generating a packet in a full delay form after performing the uniform dispersion transmission. Step (iv) includes the step of: resetting a half of a size of data to be transmitted to a reference point informing a start of congestion when a packet loss occurs in the data after the data is full-delayed.

In accordance with a further aspect of the present invention, a computer readable recording medium, the recording medium recording: a process for storing and providing TCP state information of a network which performs a data transmission; a TCP state information initializing process for initializing TCP state information according to an initial value of a previously set TCP state information or the TCP state information provided from the TCP state information providing process; a transmission mode judging process for judging a transmission mode of data to be transmitted according to the TCP state information; and a packet processing process for generating and transmitting traffic corresponding to each transmission mode classified according to the judgment result from the transmission mode judging process.

Preferably, the transmission mode includes a slow start mode, a congestion mode, and a high speed mode, and the recording medium includes a high speed mode defining process for determining a criterion of the high speed mode prior to performing the transmission mode judging process. More preferably, in the transmission mode judging process, a data transmission performance in the slow start mode ranges from a default initial value to a threshold value of the slow start mode wherein the threshold value is a value of a half of a transmission performance when a packet loss of transmission data is detected; a data transmission performance in the congestion mode ranges from the threshold value of the slow start mode to four times of the threshold value of the slow start mode; and a data transmission performance in the high speed mode ranges from four times of the threshold value of the slow start mode to eight times of the threshold value of the slow start mode to eight times of the threshold value of the slow start mode. The packet processing process includes a process which transmits a data packet to have an spacing of zero between data packets to be transmitted in the slow start mode and the congestion mode, and transmits the data packet to have the spacing which is uniformly divided for a round trip time.

The packet processing process compares a currently received window size with a previously received window size in a congestion mode in which a size of data to be transmitted is equal to or greater than that of data to be received, transmits a window at a linearly increased speed having a ratio of a value obtained by dividing one maximum segment size per received message by the size of data to be transmitted when the previously received window size is less than or equal to the currently received window size, and transmits the window in a balanced state without increasing a transmission speed when the previously received window size is greater than the currently received window size.

The packet processing process transmits the packet data at a ratio having one maximum segment size per received message in the high speed mode. The packet processing process includes a process which performs an uniform dispersion transmission for the packet data after performing the transmission of a window at a linearly increased speed and the transmission of the window in a balanced state. The packet processing process includes a process which generates a packet in a full delay form after performing the uniform dispersion transmission. The packet processing process includes a process which resets a half of a size of data to be transmitted to a reference point informing a start of a congestion when a packet loss occurs in the data after the data is full-delayed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
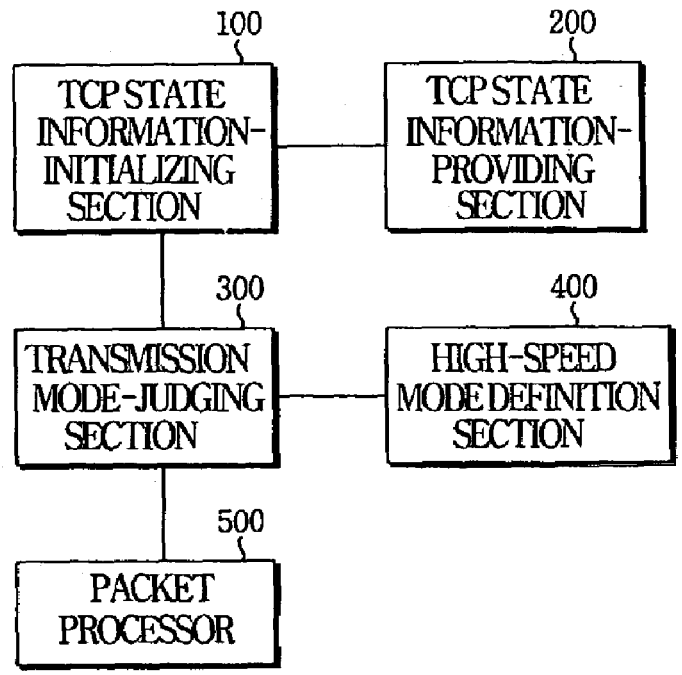
FIG. 1 is a block diagram showing a configuration of a system for controlling a data transmission according to an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

FIG. 1 is a block diagram showing a configuration of a system for control a data transmission according to an embodiment of the present invention.

As shown in FIG. 1, the system includes a TCP state information-initializing section 100, a TCP state information-providing section 200, a transmission mode-judging section 300, a high-speed mode definition section 400, and a packet processing processor 500. The TCP state information-initializing section 100 initializes TCP state information of a network through which data are transmitted. The TCP state information-providing section 200 provides the TCP state information-initializing section 100 with network resources information and TCP state information about a group to which the resources belong. The transmission mode-judging section 300 judges whether the data to be transmitted based on the TCP state information should be transmitted in an initial mode, or a congestion mode, or a high-speed mode. The high-speed mode definition section 400 determines criteria for the high-speed mode and informs the transmission mode-judging section 300 of the criteria. The packet processing processor 500 generates, controls, and transmits traffic for each mode according to the mode judgment by the transmission mode-judging section 300.

In FIG. 1, since the TCP state information-initializing section 100 does not know information related to a network state during an initial data transmission, the TCP state information-initializing section 100 initializes TCP state information according to an initial value of a previously set TCP state information or the TCP state information provided from the TCP state information-providing section 200.

The TCP state information-providing section 200 provides TCP state information of a network on which data transmitting and receiving are performed. By sharing the TCT state information and omitting a TCP initial searching mode in a grid network environment, a TCP performance is improved. That is, since a grip computing has a characteristic which communicates with computer groups in a different domain, it uses a network state value which is searched once so that it is unnecessary to search a network each time the computer groups perform TCP communication with each other, thereby increasing the transmission performance. The TCP state information-providing section 200 is constructed by using a metacomputing directory service (MDS).

The TCP state information-providing section 200 also has grid resource information necessary to the grid computer and information related to a group to which a grid resource belongs. The TCP state information-providing section 200 provides collected TCP state information to the TCT state information initializing section 100 so that the TCP state information-initializing section 100 shares network state information searched from another computer for the grid computing based on the provided TCP state information. Accordingly, although the grid computing is executed, a process which searches the network every time is omitted.

The transmission mode-judging section 300 judges a network state as a slow start mode, a congestion mode, a high speed mode, or a non-congestion mode. A transmission mode according to the present invention is judged by the following criterion. The slow start mode is a mode which searches the network state when accessing to a network at first. A data transmission performance of the slow start mode ranges from a default initial value to a threshold value of the slow start mode. The threshold value of the slow start mode is a value of a half of a transmission performance when a packet loss of transmission data is detected.

A data transmission performance of the congestion mode ranges from the threshold value of the slow start mode to four times of the threshold value of the slow start mode. When four times of the threshold value of the slow start mode is less than size of a receiver buffer, a TCP according to the present invention is similar to a conventional TCP. A data transmission performance of the high speed mode ranges from four times of the threshold value of the slow start mode to eight times of the threshold value of the slow start mode. A value of a transmission performance in the slow start mode is increased twice each time a receipt of transmitted data is confirmed. A value of a transmission performance in the congestion mode is increased by a fundamental window size of a set unit each time a receipt of transmitted data is confirmed. A value of a transmission performance in the high speed mode is increased twice as in the slow start mode each time a receipt of transmitted data is confirmed. It is because the system for controlling a data transmission should be quickly adapted to a network state at high speed in the high speed mode.

A high-speed mode definition section 400 determines a criterion of the high speed mode based on a self-similar model and provides the determined criterion of the high speed mode to the transmission mode-judging section 300. A high speed mode is not defined in a transmission control mode according to the conventional TCP. So, in order to define a threshold value of the high speed mode, the self-similar model principle is used. In accordance with the self-similar model principle, a data transmission is controlled according to statistics of a network state. The self-similar mode principle is that an internet traffic has a dispersion value corresponding to four times of an average value regardless of an optional traffic sample time for the sampling time. Accordingly, four times of a packet loss searching value (or eight times of a threshold value in the slow start mode) is set to the threshold value of the high speed mode.

Figure 2:
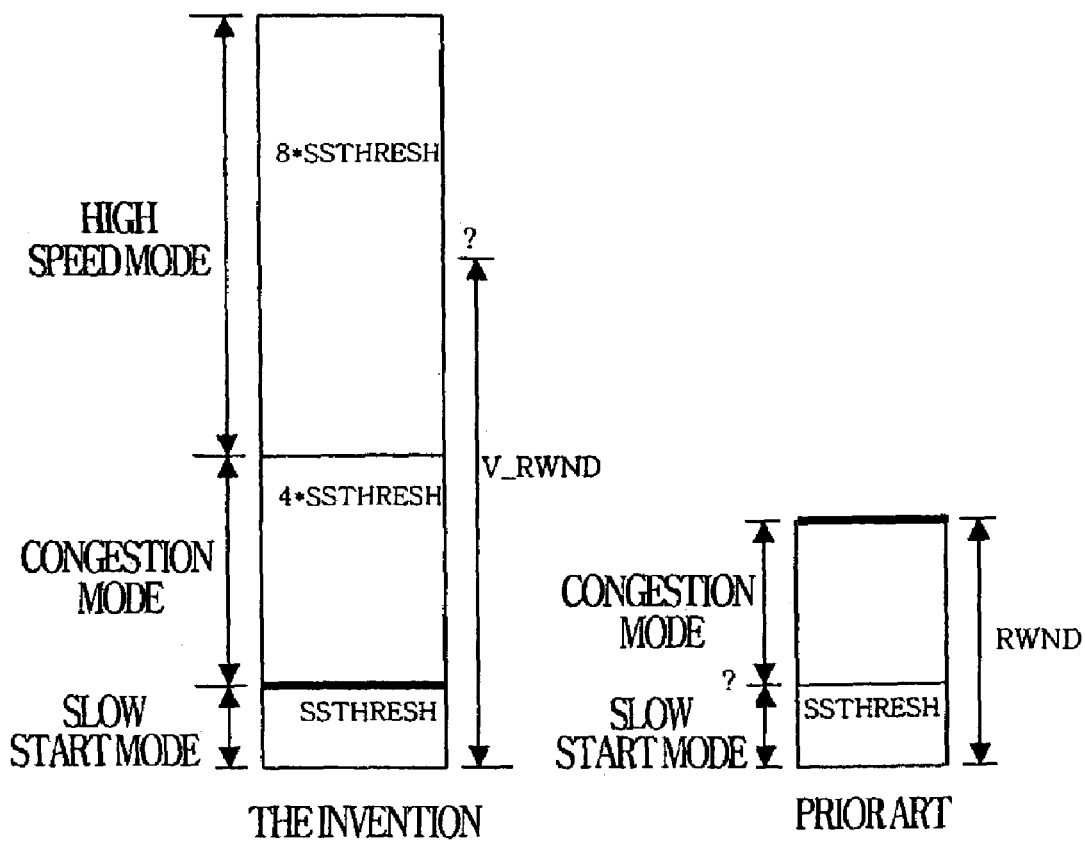
FIG. 2 is a view showing threshold values by transmission modes defined by a method for controlling a data transmission according to the present invention and a conventional TCP.

FIG. 2 is a view showing threshold values by transmission modes defined by a method for controlling a data transmission according to the present invention and a conventional TCP. In FIG. 2, numeral reference "SSTHRESH (slow start threshold)" represents a reference point notifying that congestion starts in a TCP. Numeral reference "RWND (Receive Window)" represents a size of data to be received. Numeral reference "V_RWND (virtual RWND)" represents a size of a virtual receiver buffer.

FIG. 2 shows a self-similar model based window sliding range by transmission modes. The conventional TCP is formed by supposing that a network is in a congestion state, so that a packet loss occurs in a transmission window having a size less than that of a receiver buffer over a general internet, and it changes a transmission control mode to a new mode after the occurrence of the packet loss. However, since a data transmission occurs through a ultrahigh speed network having no congestion and allowing a transmission greater than a receiver buffer size in a grid computing environment, a mode change should be practicable in an ultrahigh speed communication network allowing the transmission greater than the receiver buffer size.

A function capable of occurring the packet loss should be performed in a high speed mode. Threshold values of a window by modes such as a slow start mode, a congestion mode, and a high speed mode do not depend on a physical size of a receiving window, instead window ranges of the slow start mode, the congestion mode, and the high speed mode should be set according to a size of a virtual buffer set in proportion to a performance of a receiving host. In the embodiment of the present invention, the window ranges of the slow start mode, the congestion mode, and the high speed mode are set to 1:4:8 based on the SSTHREH. The SSTHRESH is measured based on a packet loss. A ratio of 1:4:8 is set on the basis of a principle which a dispersion value has maximal 4 four times of an average value in a self-similar model-based traffic mode.

The packet processing processor 500 generates and transmits traffic by transmission modes according to the judgment result from the transmission mode-judging section 300. The packet processing processor 500 transmits the traffic to have a spacing between packets of zero (null spacing) in a slow start mode or a congestion mode. It is to obtain a suitable bandwidth by actively generating traffic. It is possible because transmission capabilities of the slow start mode and the congestion mode are defined as a transmission capability less than a size of a receiver buffer. A conventional standard TCP also generates traffic in the same form.

The packet processing processor 500 transmits the data packet to have the spacing which is uniformly divided for a round time trip time (RTT). Accordingly, although a receiver buffer is less than a transmission capability, a receiving operation is possible. That is, after a receipt of one packet, by processing the received packet and emptying the receiver buffer prior to reaching of a next packet, a small receiver buffer can process much data.

Figure 3:
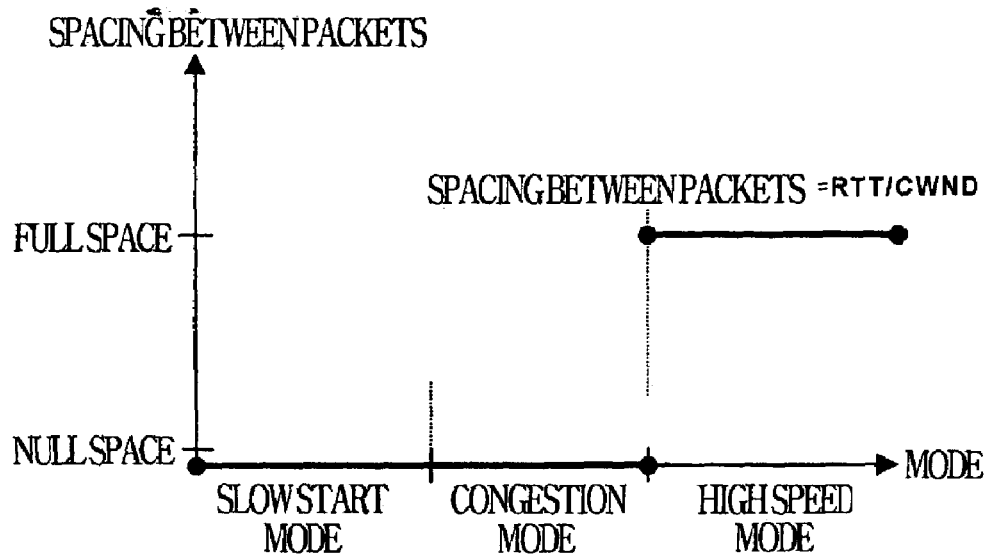
FIG. 3 is a view showing a relationship between a transmission mode and a spacing between packets.

FIG. 3 is a view showing a relationship between a transmission mode and a spacing between packets. As shown in FIG. 3, In the slow start mode and the congestion mode, an spacing between packets is 0 (null space). An spacing between packet in the high speed mode is value (full space) obtained by diving RTT by CWND. The RTT notes a time which sends a packet and receives a response thereof. The CWND is a window size which can be transmitted. In the present invention, a transmission mode is divided into 3 modes according to a state of a network. The spacing between packets varies according a kind of the transmission mode. The generation of traffic in a conventional TCP is based on a total transmitting amount per hour. However, the present invention controls a convergence of transmitting traffic in the high speed mode and generates the traffic by using a processing capability of a transmitting network to the utmost. FIG. 3 shows that the receiving host has a virtual buffer effect by uniformly dispersing traffic in the high speed mode. FIG. 3 shows that the receiving host has a characteristic which reduces a network congestion by dividing and transmitting the traffic.

In the conventional TCP, a TCP header indicates a window size which can be transmitted and received. However, in the present invention, the TCP header is a change value of a buffer size which can be received other than an absolute size of a sender/receiver buffer. That is, when a transmission capability is increased and a packet speed becomes greater than a process speed of a packet received by a receiving host, a size of the receiver buffer is reduced. By calculating the reduced size of the receiver buffer, an increased speed of a transmission capability is controlled. When interpreting a sender/receiver window size of the TCP header as a value to detect a size change value of the receiver buffer other than an absolute size which can be transmitted and received, a transmission is controlled regardless of a size of a sender/receiver buffer. It refers to as a window size free-based transmission window control in the present invention. According to the window size free-based transmission window control, a dynamic transmission exceeds a sender/receiver window size of a TCP header.

Hereinafter, a process for generating traffic and transmitting a controlled packet by the packet processing processor 500 will be explained with reference to FIGS. 4a and 4b.

Figure 4A:
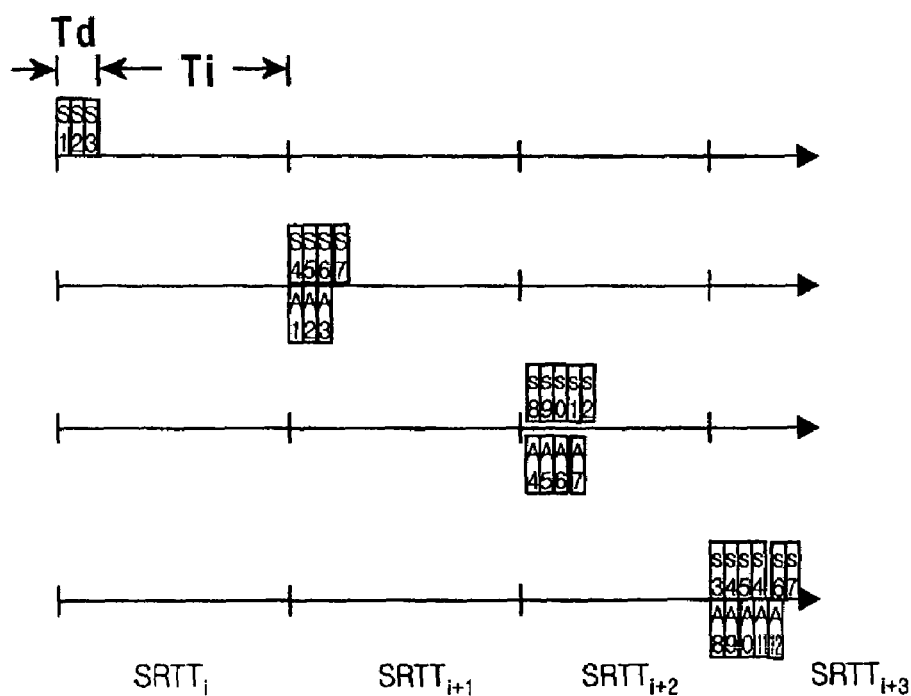
FIGS. 4a and 4b are timing charts for illustrating a packet transmission in a congestion mode and a high speed mode, respectively.
Figure 4B:
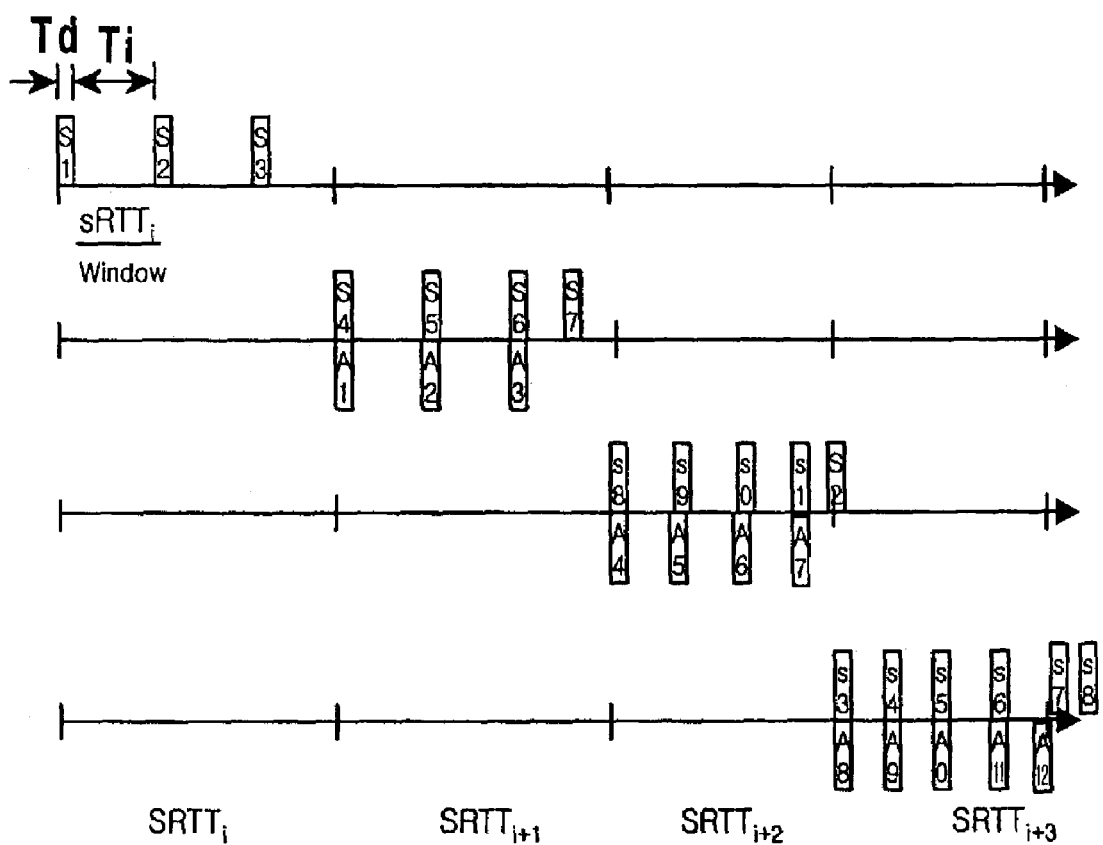

FIGS. 4a and 4b are timing charts for illustrating a packet transmission in a congestion mode and a high speed mode, respectively. Referring to FIGS. 4a and 4b, reference numeral "Td" represents a transmission time of a packet transmitted by a transmitting host. Reference numeral "Ti" represents a pause time when the packet is transmitted. Reference numeral "SRTT (Smoothing Round Trip Time)" notes an average time when a packet is sent and the response is received. Reference numeral "window" represents a size of data to be transmitted. Reference numerals "S1, S2, S3, . . . " represent segments which form packets to be transmitted. Reference numerals "A1, A2, A3, . . . " represent a response message indicating that the receiving host acknowledges a receipt of a transmitting segment. Referring to FIG. 4a, a packet having a plurality of segments is transmitted at once. After a receipt of each segment is acknowledged, segments of a next packet are transmitted. Referring to FIG. 4b, a packet to be transmitted is divided by a maximal segment unit for RTT and the packet is transmitted to have a predetermined difference in time. Hereinafter, it is referred to as an uniform dispersion transmission. When a packet is uniformly transmitted, the receiver host does not receive a data stream by a transmitting window size at a time so that it is unnecessary to identify a size of a sender buffer with a size of a receiver buffer. For example, the receiver buffer is enough to have a performance which receives at least one packet. The reason is because the receiver buffer receives one packet and processes the received packet prior to receiving a next packet. A packet transmission spacing of a transmitting host is reduced according to a receiving packet processing performance of the receiving host. That is, a size of a transmission window is reduced according to a performance of a receiving host. Therefore, the present invention improves a transmission capability by at least twice in a high speed mode.

When transmitting a packet in the high speed mode in an uniform dispersion transmission, there is a little probability that a packet reaches the receiver buffer to reverse the order according to a state of a network. As a result, it is possible to allot a sender buffer to the most part of a physical sender/receiver buffer of the conventional TCP. The reason is because a virtual buffer is applied to a receiving host by performing an uniform dispersion transmission in the high speed mode.

The greatest difference between a data transmission in a congestion mode and a data transmission in a high speed mode in that the conventional TCP continues a congestion mode type transmission because the high speed mode is not defined in a non-congestion ultrahigh speed network. Since the conventional TCP transmits data in a non-congestion high speed network in the same way shown in FIG. 4a, it can not transmit data greater than a size of the receiver buffer. However, the present invention transmits data greater than a size of the receiver buffer in a non-congestion high speed network, by defining a new high speed mode and performing an uniform dispersion transmission which allow data greater than the size of a receiver buffer to be transmitted.

Figure 5:
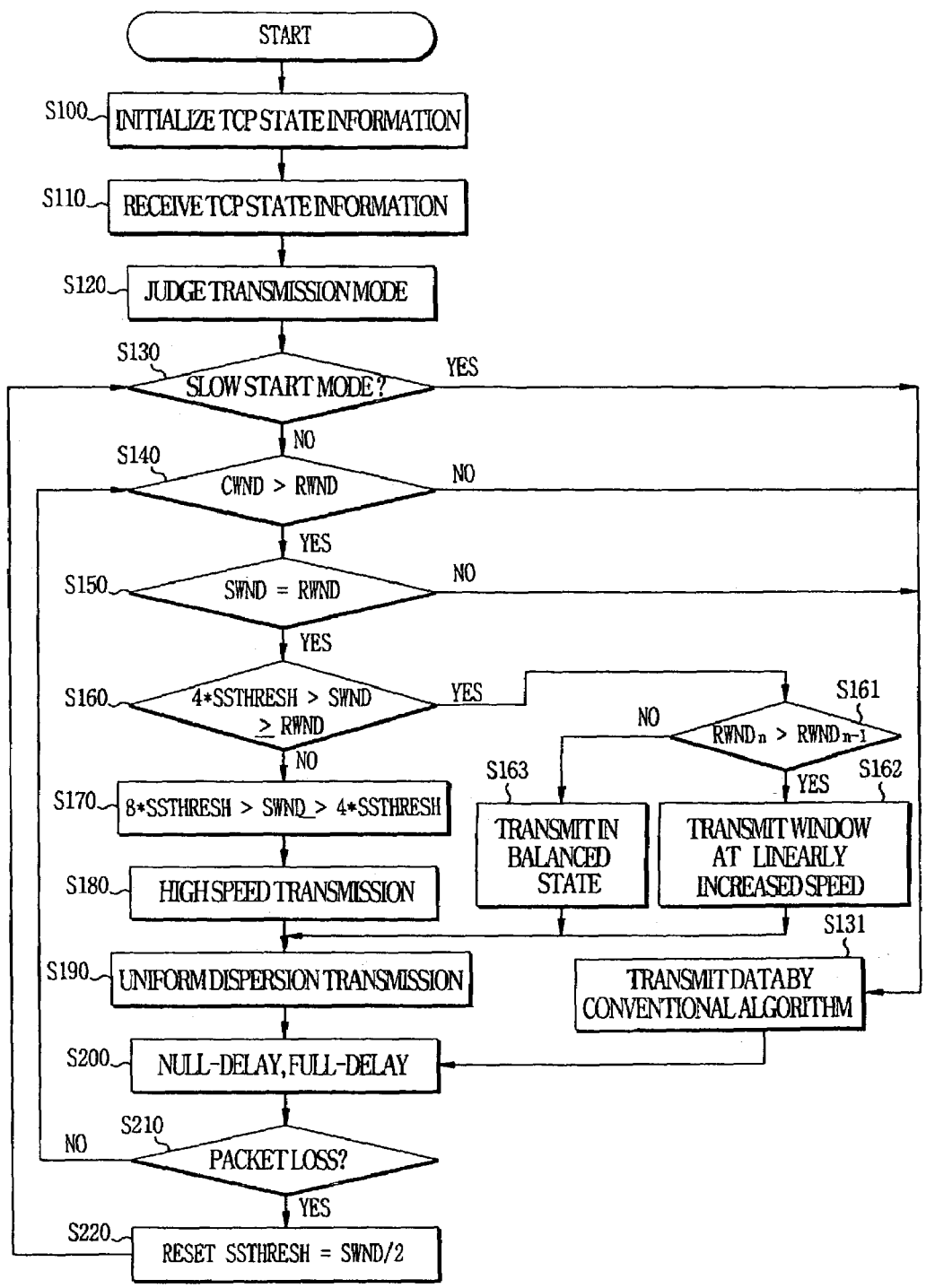
FIG. 5 is a flow chart illustrating a method for controlling a data transmission according to an embodiment of the present invention.

A description will now be given, with reference to FIG. 5, of a method for controlling a data transmission according to an embodiment of the present invention. FIG. 5 is a flow chart illustrating a method for controlling a data transmission according to an embodiment of the present invention.

The TCP state information-initializing section 100 initializes TCP state information according to an initial value of a previously set TCP state information (step S100). However, when the initialized TCP state information is invalid, the TCP state information-initializing section 100 receives and initializes TCP state information for a grid network environment provided from the TCP state information-providing section 200 (step S110). The transmission mode-judging section 300 judges a transmission mode of data to be transmitted according to the TCP state information (step S120). The transmission mode-judging section 300 judges whether the transmission mode of data is a slow start mode according to a judgment result of a data transmission mode (step S130). When the transmission mode of data is the slow start mode, the data is transmitted according to a conventional TCP algorithm (step S131). A data transmission performance of the slow start mode ranges from a default initial value to a threshold value of the slow start mode wherein the threshold value is a value of a half of a transmission performance when a packet loss of transmission data is detected.

When it is judged in step S130 that the transmission mode of data is not the slow start mode, it is judged that the transmission mode of data is a high speed mode, and it is compared whether a size CWND of a window to be transmitted is greater than size RWND of data to be received (step S140). When the size CWND of a window to be transmitted is less than or equal to the size RWND of data to be received, the data is transmitted according to a conventional TCP algorithm (step S131).

When the size CWND of a window to be transmitted is greater than he size RWND of data to be received, it is compared whether a size SWND of data to be transmitted is equal to a size RWND of data to be received (step S150). When the size SWND of data to be transmitted is different from the size RWND of data to be received, the routine returns to step S131.

When the size SWND of data to be transmitted is equal to the size RWND of data to be received, it is judged whether the size SWND of data to be transmitted is equal to or greater than the size RWND of data to be received, and the size SWND of data to be transmitted is less than four times of a reference point SSTHRESH notifying that a congestion starts in a TCP congestion control (step S160). When the size SWND of data to be transmitted is equal to or greater than the size RWND of data to be received, and less than four times of the reference point SSTHRESH, the routine goes to step S161. When the size SWND of data to be transmitted is less than the size RWND of data to be received, or is greater than four times of the reference point SSTHRESH, it is judged whether the size SWND of data to be transmitted is equal to or greater than four times of the reference point SSTHRESH, and less than eight times of the reference point SSTHRESH (step S170). When the size SWND of data to be transmitted is equal to or greater than four times of the reference point SSTHRESH, and less than eight times of the reference point SSTHRESH, the packet processing processor 500 transmits a window at a linearly increased speed having a ratio of one maximum segment size (MSS) per received message which indicates a receipt of a transmitted data (step S180), and the next step 190 is then executed.

Meanwhile, in step S161, the packet processing processor 500 compares the currently received window size RWNDn−1 with the previously received window size RWNDn. Since the present invention controls a transmission based on a comparison result between the currently received window size RWNDn−1 and the previously received window size RWNDn, it dynamically increases a size of a virtual buffer to a range which a bandwidth of a network and a performance of a receiving host allow without limiting to a receiving window buffer size of a receiving host in an ultrahigh speed network. The reason is because the conventional TCP transmits information related to a size of data to received but the present invention can inform whether a transmission speed of a transmitting system is faster or lower than a processing capability of a receiving system. Accordingly, the present invention significantly improves a transmission performance in a high speed mode in comparison with the conventional TCP. The present invention efficiently supports Internet having bi-functional operations of congestion and non-congestion networks. Accordingly, a size of a TCP sender/receiver window is significantly changed.

In step S162, the packet processing processor 500 transmits a window at a linearly increased speed having a ratio of a value obtained by dividing one MSS per received message by the size SWND of data to be transmitted. In step S163, the packet processing processor 500 transmits the window in a balanced state without increasing a transmission speed.

After performing steps S162, S163, and S180, data for an uniform dispersion transmission is performed (step S190). Data transmitted according to a conventional TCP algorithm is nul-delayed and data uniform-dispersed in step S190 is full-delayed (step S200).

It is judged whether a packet loss occurs in the data (step S210). When the packet loss does not occur, the routine returns to step S140. When the packet loss occurs, a half of a size of data to be transmitted is reset to the reference point SSTHRESH informing a start of a congestion (step S220) and the routine returns to step S130.

As stated above with reference to FIG. 5, the present invention has functions for parts which the convention TCP can not define. The present invention discriminates whether the data are processed in a congestion mode or in a high speed mode in steps S140 to S160 during the transmission of data greater than a size of a receiver buffer. At this time, a transmission capability of data to be received is calculated by a window size free-based transmission window control function. In the high speed mode, the data is transmitted while increasing a size of a transmitting window in order to detect a limit of the high speed mode.

Descriptions will be given of ranges of a congestion mode and a high speed mode, and an uniform dispersion transmission.

When four times of a threshold value in a slow start mode is less than a size of a receiver buffer: a total amount control type data transmission control is performed and a space between packets is absent.

When four times of a threshold value in a slow start mode is greater than a size of a receiver buffer: an uniform dispersion transmission for the data is performed until a transmission capability starts to be greater than a size of a receiver buffer. When the transmission capability ranges from a size of a receiver buffer to four times of a threshold value in the slow start mode, the present invention is in a congestion mode. Accordingly, when the receiving acknowledgement signal are all received, a window having a basic transmission size is increased.

A data transmission capability of the high speed mode is defined as a range from four times of the threshold value of the slow start mode to eight times of the threshold value of the slow start mode. As a transmission capability is increased greater than a size of a receiver buffer and becomes greater than four times of a threshold value in a slow start mode, each time an uniform dispersion transmission is performed and simultaneously a receipt acknowledgement is completed, the transmission capability is increased by twice.

Figure 6:
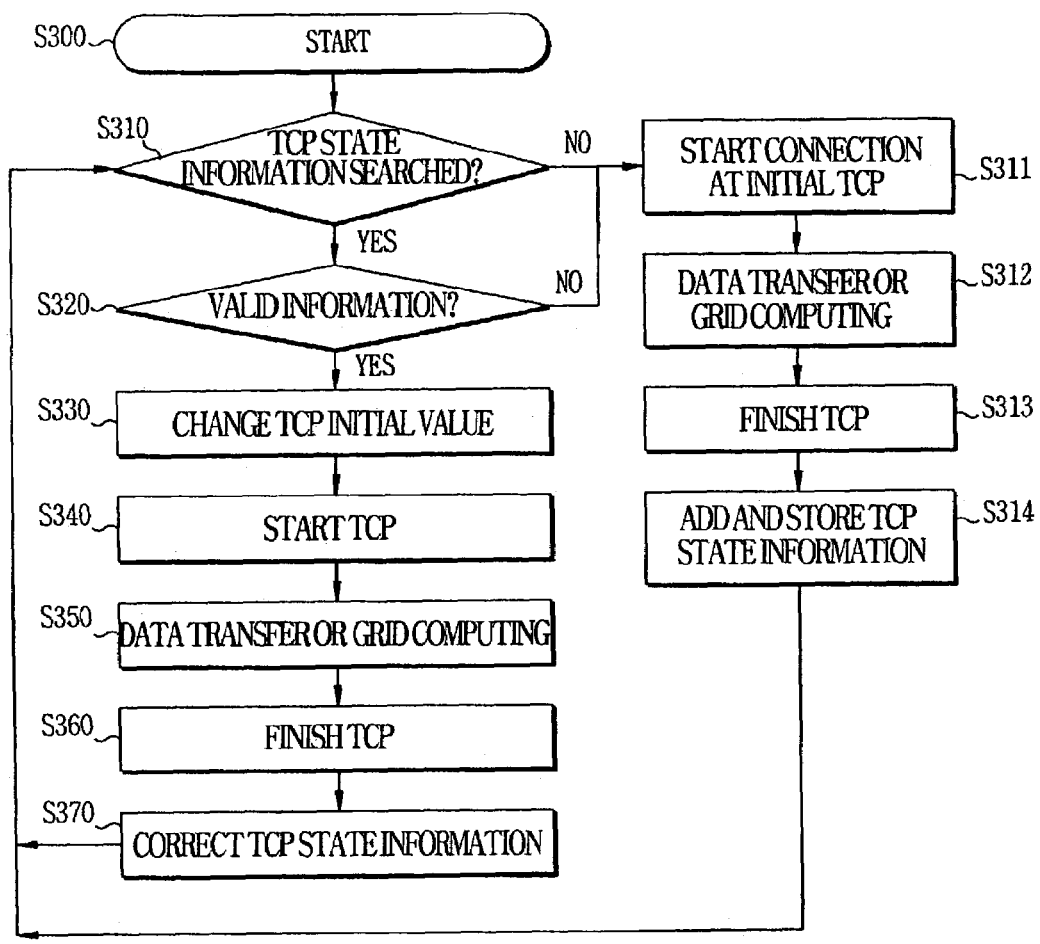
FIG. 6 is a flow chart for illustrating an information sharing operation with respect to TCP state information according to an embodiment of the present invention.

An information sharing operation with respect to TCP state information will be described with reference to FIG. 6. FIG. 6 is a flow chart for illustrating an information sharing operation with respect to TCP state information according to an embodiment of the present invention.

In step S300, a routine for sharing the TCP state information starts. Computing resources in the same group participating in a grid computing searches TCP state information which is stored in an MDS. When the TCP state information is not searched, a TCP access starts by means of a conventional TCP manner (step S311). Data transferring or grid computing is performed (step S312). When the data transferring or grid computing is completed, a TCP access finishes (step S313). The searched TCP state information is added and stored into the MDS (step S314) and the routine goes to step S310.

When the TCP state information is searched in step S310, it is judged whether the TCP information is valid (step S320). When the TCP information is invalid, the routine goes to step S311.

When the TCP information is valid, a TCP initial value is changed to the valid TCP state information (step S330), and the TCP access starts by means of a conventional TCP manner (step S340). Data transferring or grid computing is performed (step S350). When the data transferring or grid computing is completed, a TCP access finishes (step S360). The searched TCP state information is corrected (step S370) and the routine returns to step S310.

As described previously, when a grid network operates in a congestion state, in order to execute a dispersion parallel type Internet computing between computer groups which participate in a grid computing, TCP connections with a computer in an opposite group participating in the grid computing are frequently set. In the conventional TCP, each time the TCP is set, a slow start mode searching a state of a network is performed. It significantly lowers a performance of the grid computing. However, the present invention provides a method for sharing network state information which any one computer which participates in the grid computing. The method supports a TCP state information service provided from the grid computing and additionally defines TCP state information. The computers participating in the grid computing share TCP state information by using the additionally defined TCP state information. That is, the present invention provides a network resource participating in the grid computing and an information service related to a computing resource using MDS like a Domain Name Service (DNS) of an Internet service. By adding TCP congestion control information to such MDS-based TCP state information service, when resources participating in the grid computing shares the information, a part of a procedure according to a TCP is omitted. It significantly reduces a network-based latency.

As mentioned above, in accordance with the present invention, by using a virtual buffer concept, the same effect as increasing a physical buffer is obtained without increasing a size of the physical buffer, so that the transmission capability in an ultrahigh speed communication network or a grid network environment is improved. In addition, by sharing TCP state information in the grid network environment, a grid computing performance is significantly improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for controlling a data transmission, comprising:
    a TCP state information-providing section for storing and providing TCP state information of a network which performs a data transmission;
    a TCP state information-initializing section for initializing TCP state information according to an initial value of a previously set TCP state information or the TCP state information provided from the TCP state information-providing section;
    a transmission mode-judging section for judging a transmission mode of data to be transmitted according to the TCP state information;

a packet processing processor for generating and transmitting traffic corresponding to each transmission mode classified according to the judgment result from the transmission mode-judging section;

wherein the transmission mode includes a slow start mode, a congestion mode, and a high speed mode, and the system further includes a high-speed mode definition section for determining a criterion of the high speed mode and providing the determined criterion of the high speed mode to the transmission mode-judging section; and wherein the packet processing processor compares a currently received window size with a previously received window size in a congestion mode in which a size of data to be transmitted is equal to or greater than that of data to be received, when the previously received window size is less than or equal to the currently received window size, the packet processing processor transmits a window at a linearly increased speed having a ratio of a value obtained by dividing one maximum segment size per received message by the size of data to be transmitted, and when the previously received window size is greater than the currently received window size, the packet processing processor transmits the window in a balanced state without increasing a transmission speed.

2. The system as recited in claim 1, wherein the TCP state information-providing section is constructed by using a Metacomputing Directory Service (MDS).

3. The system as recited in claim 1, wherein a data transmission performance in the slow start mode ranges from a default initial value to a threshold value of the slow start mode wherein the threshold value is a value of a half of a transmission performance when a packet loss of transmission data is detected;

a data transmission performance in the congestion mode ranges from the threshold value of the slow start mode to four times of the threshold value of the slow start mode; and a data transmission performance in the high speed mode ranges from four times of the threshold value of the slow start mode to eight times of the threshold value of die slow start mode.

4. The system as recited in claim 1, wherein the packet processing processor transmits a data packet to have a spacing of zero between data packets to be transmitted in the slow start mode and the congestion mode, and the packet processing processor transmits the data packet to have the spacing which is uniformly divided for a round trip time.

5. The system as recited in claim 1, wherein the packet processing processor transmits the packet data at a ratio having one maximum segment size per received message in the high speed mode.

6. A method for controlling a data transmission, the method comprising the steps of:
(i) storing and providing TCP state information of a network which performs a data transmission;
(ii) initializing TCP state information according to an initial value of a previously set TCP state information or the TCP state information provided in step (i);
(iii) judging a transmission mode of data to be transmitted according to the TCP state information; and
(iv) generating and transmitting traffic corresponding to each transmission mode classified according to the judgment result by step (iii);
wherein the transmission mode includes a slow start mode, a congestion mode, and a high speed mode, and the method further comprising the step of of defining a criterion of the high speed mode prior to performing step (iii); and wherein step (iv) comprises the substeps of:
(iv-1) comparing a currently received window size with a previously received window size in a congestion mode in which a size of data to be transmitted is equal to or greater than that of data to be received,
(iv-2) transmitting a window at a linearly increased speed having a ratio of a value obtained by dividing one maximum segment size per received message by the size of data to be transmitted when the previously received window size is less than or equal to the currently received window size, and
(iv-3) transmitting the window in a balanced state without increasing a transmission speed of the window when the previously received window size is greater than the currently received window size.

7. The method as recited in claim 6, wherein in step (iii);
a data transmission performance in the slow start mode ranges from a default initial value to a threshold value of the slow start mode wherein the threshold value is a value of a half of a transmission performance when a packet loss of transmission data is detected;
a data transmission performance in the congestion mode ranges from the threshold value of the slow start mode to four times of the threshold value of the slow start mode; and
a data transmission performance of the high speed mode ranges from four times of the threshold value of the slow start mode to eight times of the threshold value of the slow start mode.

8. The method as recited in claim 6, wherein step (iv) includes the substep of transmitting a data packet to have an spacing of zero between data packets to be transmitted in the slow start mode and the congesting mode, and transmitting the data packet to have the spacing which is uniformly divided for a round trip time.

9. The method as recited in claim 6, wherein step (iv) includes the step of transmitting the packet data at a ratio having one maximum segment size per received message in the high speed mode.

10. The method as recited in claim 9, wherein step (iv) includes the step of performing an uniform dispersion transmission for the data after performing steps (iv-2) and (iv-3).

11. The method as recited in claim 6, wherein step (iv) includes the step of performing an uniform dispersion transmission for the packet data after performing steps (iv-2) and (iv-3.

12. The method as recited in claim 11, wherein step (iv) includes the step of generating a packet in a full delay form after performing the uniform dispersion transmission.

13. The method as recited in claim 12, wherein step (iv) includes the step of resetting a half of a size of data to be transmitted to a reference point informing a start of a congestion when a packet loss occurs in the data after the data is full-delayed.

14. A computer readable medium having recorded thereon a program in executable form for configuring a programmable device to execute the following:
a process for storing and providing TCP state information of a network which performs a data transmission;
a TCP state information initializing process for initializing TCP state information according to an initial value of a previously set TCP state information or the TCP state information provided from the TCP state information providing process;

a transmission mode judging process for judging a transmission mode of data to be transmitted according to the TCP state information; and a packet processing process for generating and transmitting traffic corresponding to each transmission mode classified according to the judgment result from the transmission mode judging process;

wherein the transmission mode includes a slow start mode, a congestion mode, and a high speed mode, and the recording medium includes a high speed mode defining process for determining a criterion of the high speed mode prior to performing the transmission mode judging process; and wherein the packet processing process compares a currently received window size with a previously received window size in a congestion mode in which a size of data to be transmitted is equal to or greater than that of data to be received, transmits a window at a linearly increased speed having a ratio of a value obtained by dividing one maximum segment size per received message by the size of data to be transmitted when the previously received window size is less than or equal to the currently received window size, and transmits the window in a balanced state without increasing a transmission speed when the previously received window size is greater than the currently received window size.

15. The medium as recited in claim 14, wherein, in the transmission mode judging process, a data transmission performance in the slow start mode ranges from a default initial value to a threshold value of the slow start mode wherein the threshold value is a value of a half of a transmission performance when a packet loss of transmission data is detected;

a data transmission performance in the congestion mode ranges from the threshold value of the slow start mode to four times of the threshold value of the slow start mode; and a data transmission performance in the high speed mode ranges from four times of the threshold value of the slow start mode to eight times of the threshold value of the slow start mode.

16. The medium as recited in claim 14, wherein the packet processing process includes a process which transmits a data packet to have an spacing of zero between data packets to be transmitted in the slow start mode and the congestion mode, and transmits the data packet to have the spacing which is uniformly divided for a round trip time.

17. The medium as recited in claim 14, wherein the packet processing process transmits the packet data at a ratio having one maximum segment size per received message in the high speed mode.

18. The medium as recited in claim 17, wherein the packet processing process includes a process which performs an uniform dispersion transmission for the data after performing the transmission of a window at a linearly increased speed and the transmission of the window in a balanced state.

19. The medium as recited in claim 14, wherein the packet processing process includes a process which performs an uniform dispersion transmission for the packet data after performing the transmission of a window at a linearly increased speed and the transmission of the window in a balanced state.

20. The medium as recited in claim 19, wherein the packet processing process includes a process which generates a packet in a full delay form after performing the uniform dispersion transmission.

21. The medium as recited in claim 20, wherein the packet processing process includes a process which resets a half of a size of data to be transmitted to a reference point informing a start of a congestion when a packet loss occurs in the data after the data is full-delayed.

* * * * *